(12) United States Patent
Freeman et al.

(10) Patent No.: US 11,732,604 B1
(45) Date of Patent: Aug. 22, 2023

(54) CERAMIC MATRIX COMPOSITE BLADE TRACK SEGMENT WITH INTEGRATED COOLING PASSAGES

(71) Applicant: Rolls-Royce Corporation, Indianapolis, IN (US)

(72) Inventors: Ted J. Freeman, Danville, IN (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/073,176

(22) Filed: Dec. 1, 2022

(51) Int. Cl.
*F01D 11/08* (2006.01)
*F01D 25/12* (2006.01)
*F01D 25/28* (2006.01)

(52) U.S. Cl.
CPC .............. *F01D 25/12* (2013.01); *F01D 11/08* (2013.01); *F01D 25/28* (2013.01); *F05D 2230/64* (2013.01); *F05D 2240/11* (2013.01); *F05D 2260/232* (2013.01); *F05D 2260/30* (2013.01); *F05D 2300/6033* (2013.01)

(58) Field of Classification Search
CPC .......... F01D 25/12; F01D 11/08; F01D 25/28; F05D 2230/64; F05D 2240/11
See application file for complete search history.

(56) References Cited

U.S. PATENT DOCUMENTS

| | | |
|---|---|---|
| 3,066,911 A | 12/1962 | Anderson et al. |
| 3,807,891 A | 4/1974 | Mc Dow et al. |
| 3,880,435 A | 4/1975 | Thornbald |
| 4,676,715 A | 6/1987 | Imbault et al. |
| 4,863,345 A | 9/1989 | Thompson et al. |
| 5,080,557 A | 1/1992 | Berger |
| 5,116,199 A | 5/1992 | Ciokajlo |
| 5,203,673 A | 4/1993 | Evans |
| 5,295,787 A | 3/1994 | Leonard et al. |
| 5,459,995 A | 10/1995 | Norton et al. |
| 5,584,651 A | 12/1996 | Pietraszkiewicz et al. |
| 5,593,276 A | 1/1997 | Proctor et al. |
| 5,609,469 A | 3/1997 | Worley et al. |
| 6,142,731 A | 11/2000 | Dewis et al. |
| 6,821,085 B2 | 11/2004 | Darkins et al. |
| 6,877,952 B2 | 4/2005 | Wilson |
| 6,884,026 B2 | 4/2005 | Glynn et al. |
| 7,210,899 B2 | 5/2007 | Wilson, Jr. |
| 7,494,317 B2 | 2/2009 | Keller et al. |
| 7,534,086 B2 | 5/2009 | Mazzola et al. |
| 7,726,936 B2 | 6/2010 | Keller et al. |
| 7,753,643 B2 | 7/2010 | Gonzalez et al. |
| 8,118,546 B2 * | 2/2012 | Morrison .................. F01D 9/04 415/173.1 |
| 8,128,350 B2 | 3/2012 | Schiavo et al. |
| 8,388,309 B2 | 3/2013 | Marra et al. |
| 8,790,067 B2 | 7/2014 | Mccaffrey et al. |
| (Continued) | | |

FOREIGN PATENT DOCUMENTS

FR 3056636 A1 3/2018

*Primary Examiner* — Eldon T Brockman
(74) *Attorney, Agent, or Firm* — Barnes & Thornburg LLP

(57) ABSTRACT

A turbine shroud assembly adapted for use with a gas turbine engine includes a carrier, a seal segment, and a mount pin assembly. The carrier is configured to be coupled to a turbine case. The seal segment is shaped to define a gas path boundary of the shroud assembly. The mount pin assembly is configured to couple the seal segment to the carrier.

20 Claims, 7 Drawing Sheets

(56) References Cited

U.S. PATENT DOCUMENTS

| | | | |
|---|---|---|---|
| 8,905,709 | B2 | 12/2014 | Dziech et al. |
| 8,944,756 | B2 | 2/2015 | Lagueux |
| 8,979,489 | B2 | 3/2015 | Taillant et al. |
| 9,587,504 | B2 | 3/2017 | Mccaffrey et al. |
| 9,587,517 | B2 * | 3/2017 | Vetters .................. F01D 11/24 |
| 9,863,265 | B2 | 1/2018 | Stapleton |
| 9,874,104 | B2 | 1/2018 | Shapiro |
| 10,024,193 | B2 | 7/2018 | Shapiro |
| 10,030,541 | B2 | 7/2018 | Vetters et al. |
| 10,082,039 | B2 | 9/2018 | Hanson |
| 10,132,197 | B2 | 11/2018 | Heitman et al. |
| 10,174,628 | B2 | 1/2019 | Humhauser et al. |
| 10,301,960 | B2 | 5/2019 | Stapleton et al. |
| 10,370,991 | B2 | 8/2019 | Wilson et al. |
| 10,378,385 | B2 | 8/2019 | Fesson et al. |
| 10,378,386 | B2 | 8/2019 | Roussille et al. |
| 10,415,426 | B2 | 9/2019 | Quennehen et al. |
| 10,415,427 | B2 | 9/2019 | Quennehen et al. |
| 10,422,241 | B2 | 9/2019 | Mccaffrey et al. |
| 10,428,688 | B2 | 10/2019 | Quennehen et al. |
| 10,577,963 | B2 | 3/2020 | Mccaffrey |
| 10,590,803 | B2 | 3/2020 | Quennehen et al. |
| 10,598,045 | B2 | 3/2020 | Tableau et al. |
| 10,605,120 | B2 | 3/2020 | Quennehen et al. |
| 10,619,517 | B2 | 4/2020 | Quennehen et al. |
| 10,626,745 | B2 | 4/2020 | Roussille et al. |
| 10,655,501 | B2 | 5/2020 | Lepretre et al. |
| 10,689,998 | B2 | 6/2020 | Stapleton et al. |
| 10,690,007 | B2 | 6/2020 | Quennehen et al. |
| 10,724,399 | B2 | 7/2020 | Carlin et al. |
| 10,753,221 | B2 | 8/2020 | Barker et al. |
| 10,787,924 | B2 | 9/2020 | Quennehen et al. |
| 10,815,810 | B2 | 10/2020 | Barker et al. |
| 10,907,487 | B2 | 2/2021 | Zurmehly et al. |
| 10,907,501 | B2 | 2/2021 | Filippi et al. |
| 10,934,872 | B2 | 3/2021 | Tableau et al. |
| 10,968,761 | B2 | 4/2021 | Barker et al. |
| 11,015,613 | B2 | 5/2021 | Kerns et al. |
| 11,021,988 | B2 | 6/2021 | Tableau et al. |
| 11,021,990 | B2 | 6/2021 | Filippi |
| 11,028,720 | B2 | 6/2021 | Tableau et al. |
| 11,041,399 | B2 | 6/2021 | Lutjen et al. |
| 11,047,245 | B2 | 6/2021 | Mccaffrey |
| 11,078,804 | B2 | 8/2021 | Tableau et al. |
| 11,085,316 | B2 | 8/2021 | Barker et al. |
| 11,085,317 | B2 | 8/2021 | Johnson et al. |
| 11,111,822 | B2 | 9/2021 | Tableau et al. |
| 11,111,823 | B2 | 9/2021 | Jarrossay et al. |
| 11,143,050 | B2 * | 10/2021 | Roy Thill ............... F01D 11/08 |
| 11,174,747 | B2 | 11/2021 | Roy Thill et al. |
| 11,174,795 | B2 | 11/2021 | Lutjen et al. |
| 11,215,064 | B2 | 1/2022 | Arbona et al. |
| 11,215,081 | B2 | 1/2022 | Schilling et al. |
| 11,255,209 | B2 | 2/2022 | Clark et al. |
| 11,326,470 | B2 | 5/2022 | Dyson et al. |
| 11,365,635 | B2 | 6/2022 | Read et al. |
| 11,441,434 | B2 | 9/2022 | Danis et al. |
| 11,466,585 | B2 | 10/2022 | Arbona et al. |
| 2009/0208284 | A1 | 8/2009 | Funnell |
| 2016/0186611 | A1 | 6/2016 | Vetters et al. |
| 2016/0186999 | A1 | 6/2016 | Freeman et al. |
| 2016/0319688 | A1 | 11/2016 | Thibault et al. |
| 2016/0333715 | A1 | 11/2016 | Mccaffrey |
| 2017/0268366 | A1 | 9/2017 | Mccaffrey et al. |
| 2018/0051581 | A1 | 2/2018 | Quennehen et al. |
| 2018/0051591 | A1 | 2/2018 | Quennehen et al. |
| 2018/0073398 | A1 | 3/2018 | Quennehen et al. |
| 2018/0080343 | A1 | 3/2018 | Groleau et al. |
| 2018/0156069 | A1 | 6/2018 | Quennehen et al. |
| 2018/0291769 | A1 | 10/2018 | Vetters et al. |
| 2018/0355761 | A1 | 12/2018 | Maar |
| 2019/0040758 | A1 | 2/2019 | Quennehen et al. |
| 2019/0040761 | A1 | 2/2019 | Carlin et al. |
| 2019/0084892 | A1 | 3/2019 | Subramanian et al. |
| 2019/0101027 | A1 | 4/2019 | Lepretre et al. |
| 2019/0128132 | A1 | 5/2019 | Tableau et al. |
| 2021/0131300 | A1 | 5/2021 | Arbona et al. |
| 2022/0003126 | A1 | 1/2022 | Roy Thill et al. |
| 2022/0056809 | A1 | 2/2022 | Hock et al. |
| 2022/0120198 | A1 | 4/2022 | Schilling et al. |

* cited by examiner

CERAMIC MATRIX COMPOSITE BLADE TRACK SEGMENT WITH INTEGRATED COOLING PASSAGES

FIELD OF THE DISCLOSURE

The present disclosure relates generally to gas turbine engines, and more specifically to turbine shroud assemblies adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and an output shaft. Left-over products of the combustion are exhausted out of the turbine.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to high temperatures.

SUMMARY

The present disclosure may comprise one or more of the following features and combinations thereof.

A turbine shroud assembly adapted to fuse with a gas turbine engine may include a carrier, a seal segment, and a mount pin assembly. The carrier may include metallic materials. The seal segment may include ceramic matrix composite materials.

The carrier may be shaped to include an outer wall, a forward support wall, an aft support wall, and an intermediate support wall. The outer wall may extend circumferentially at least partway about an axis. The forward support wall may extend radially inward from the outer wall. The aft support wall may be spaced axially form the forward support wall that may extend radially inward from the outer wall. The intermediate support wally may extend radially inward from the outer wall.

The seal segment may be shaped to include a runner, a forward attachment flange, and an aft attachment flange. The runner may extend circumferentially partway around the axis to define a gas path boundary of the shroud assembly. The forward attachment flange may extend radially outward from the runner arranged between the foreword support wall and the intermediate support wall of the carrier. The aft attachment flange may extend radially outward from the runner arranged between the aft support wall and the intermediate support wall of the carrier.

The mount pin assembly may include a pin that extends axially into the forward support wall, the forward attachment flange, the intermediate support wall, the aft attachment flange, and the aft support wall of the carrier.

At least one of the forward attachment flange and the aft attachment flange may be formed to include a first air passage that has an inlet and an outlet. The inlet may open radially inward into a radially outward facing surface of the at least one of the forward attachment flange and the aft attachment flange. The outlet may open into one of an axially facing and circumferentially facing surface of the at least one of the forward attachment flange and the aft attachment flange so that air passes through the first air passage to regulate a temperature of the at least one of the forward attachment flange and the aft attachment flange.

In some embodiments, the at least one of the forward attachment flange and the aft attachment flange may be the forward attachment flange and the outlet opens into the axially facing surface of the forward attachment flange. In some embodiments, the forward support wall may include a forward flange that extends radially inward from the outer wall. The outlet may be located at least partially radially inward of the forward flange.

In some embodiments, the forward attachment flange may be formed to include a second air passage that extends radially through a radially outward facing surface of the forward attachment flange and opens out of a circumferentially facing surface of the forward attachment flange. In some embodiments, the turbine shroud assembly may further include a third air passage formed in the forward attachment flange that extends forward attachment flange circumferentially and fluidly connects with the first air passage and the second air passage.

In some embodiments, the at least one of the forward attachment flange and the aft attachment flange may the aft attachment flange. The outlet may open into the circumferentially facing surface of the aft attachment flange. In some embodiments, the aft support wall may include an aft flange and a chordal seal. The aft flange may extend radially inward from the outer wall. The chordal seal may extends axially aft from the aft flange into contact with the aft attachment flange. The outlet may be located at least partially radially inward of the chordal seal.

In some embodiments, the aft attachment flange may be formed to include a second air passage that extends radially through a radially outward facing surface of the of the aft attachment flange and opens out of a circumferentially facing surface of the aft attachment flange. In some embodiments, the turbine shroud assembly may further include a third air passage formed in the aft attachment flange that extends aft attachment flange circumferentially and fluidly connects with the first air passage and the second air passage.

In some embodiments, the pin may include a forward pin and an aft pin circumferentially and radially aligned with the forward pin. The forward pin may extend into the forward attachment flange of the seal segment and the aft pin may extend into the aft attachment flange of the seal segment. In some embodiments, the intermediate wall may include a forward intermediate flange and an aft intermediate flange. The forward pin may extend into the forward intermediate flange, and the aft pin may extend into the aft intermediate flange.

In some embodiments, the turbine shroud assembly may further include a second air passage. The at least one of the forward attachment flange and the aft attachment flange may be both the forward attachment flange and aft attachment flange. The outlet of the first air passage may open into the axially facing surface of the forward attachment flange. The turbine shroud assembly may further include a second air passage having an inlet and an outlet. The inlet may open radially inward into a radially outward facing surface of the aft attachment flange. The outlet may open into the axially facing surface of the aft attachment flange.

According to another aspect of the present disclosure, a turbine shroud assembly adapted for use with a gas turbine engine may include a carrier, a seal segment, and a mount pin assembly.

The carrier may include an outer wall, a first support wall, a second support wall, and a third support wall. The outer wall may extend. circumferentially at least partway about an axis. The first support wall may extend radially inward from the outer wall. The second support wall may be spaced axially from the first support wall that extends radially inward from the outer wall. The third support wall may be located axially between the first support wall and the second support wall that extends radially inward from the outer wall.

The seal segment may be shaped to include a runner, a first attachment flange, and a second attachment flange. The runner may extend circumferentially partway around the axis. The first attachment flange may extend radially outward from the runner and may be arranged between the first support wall and the third support wall of the carrier. The second attachment flange may radially outward from the runner and may be arranged between the second support wall and the third support wall of the carrier.

The mount pin assembly may include a pin. The pin may extend axially into the first support wall, the first attachment flange, the third support wall, the second attachment flange, and the second support wall of the carrier.

The first attachment flange may be formed to include a first air passage. The first air passage may include an inlet and an outlet. The inlet may open in to a radially outward facing surface of the first attachment flange. The outlet may open out of one of an axially facing and circumferentially facing surface of the first attachment flange.

In some embodiments, the outlet may open into the axially facing surface of the first attachment flange. In some embodiments, the first support wall may include a first flange that extends radially inward from the outer wall. The outlet may be located at least partially radially inward of the first flange.

In some embodiments, the first attachment flange may be formed to include a second air passage. The second air passage may extend radially through a radially outward facing surface of the first attachment flange and open out of a circumferentially facing surface of the first attachment flange. In some embodiments, the turbine shroud assembly may further include a third air passage formed in the first attachment flange that extends circumferentially and fluidly connects with the first air passage and the second air passage.

In some embodiments, the outlet may open into the circumferentially facing surface of the first attachment flange.

In some embodiments, the pin may include a first pin and a second pin circumferentially and radially aligned with the first pin. The first pin may extend into the first attachment flange of the seal segment. The second pin may extend into the second attachment flange of the seal segment. In some embodiments, the third wall may include a first intermediate flange and a second intermediate flange. The first pin may extend into the first intermediate wall, and the second pin may extend into the second intermediate wall.

These and other features of the present disclosure will become more apparent from the following description of the illustrative embodiments.

DETAILED DESCRIPTION OF THE DRAWINGS

Figure 1:
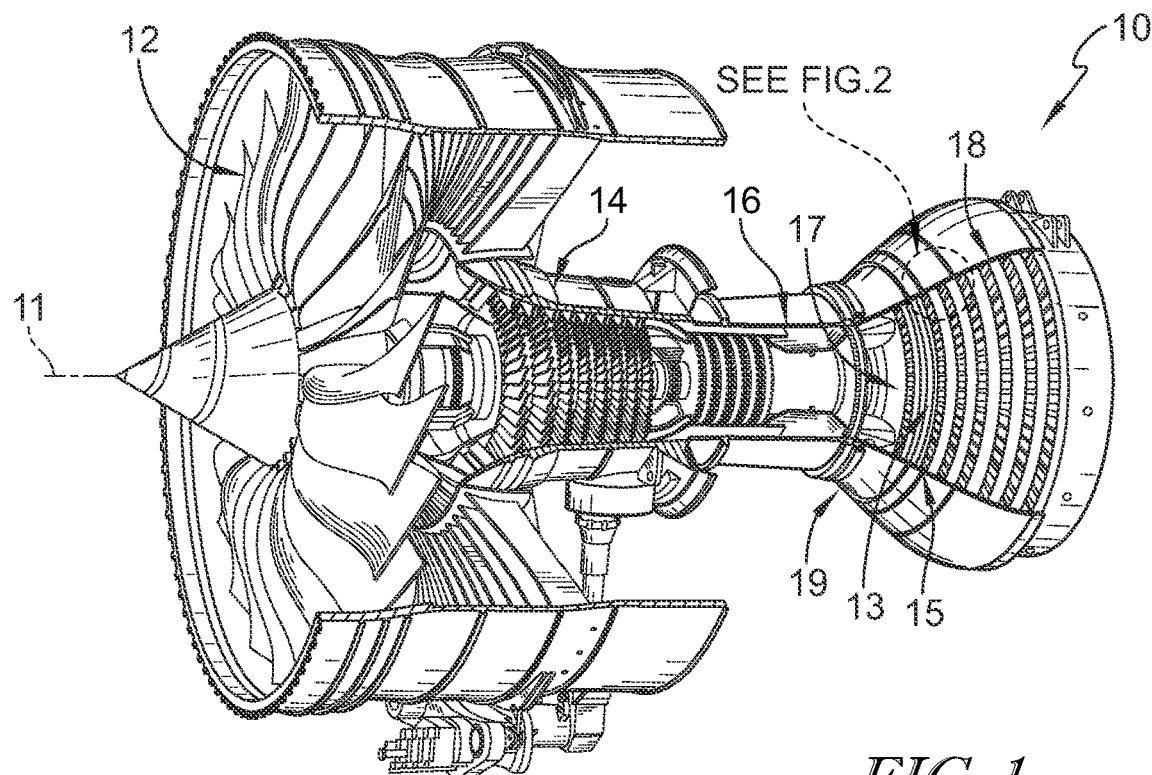
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

A gas turbine engine 10 includes a fan 12, a compressor 14, a combustor 16, and a turbine 18 as shown in FIG. 1. A turbine shroud segment 22 adapted for use with the turbine 18 of the gas turbine engine 10 is shown in FIGS. 2-6. The turbine shroud segment 22 includes a carrier 24, a seal segment 26, and a mount pin assembly 28 configured to couple the seal segment 26 to the carrier 24. The carrier 24 is configured to be coupled to a turbine case 19 of the gas turbine engine 10. The seal segment 26 defines a gas path 17 boundary of the gas turbine engine 10. The mount pin assembly 28 includes a first split-pin arrangement 30 and a second split-pin arrangement 32 that cooperate to couple the seal segment 26 with the carrier 24 to support the seal segment 26 radially relative to an axis 11 of the gas turbine engine 10.

The seal segment 26 is shaped to include a runner 70, a forward attachment flange 72, and an aft attachment flange 74 as shown in FIGS. 3-6. The runner 70 extends circumferentially partway around the axis 11 to define the gas path boundary 17 of the shroud assembly 22. The forward and aft attachment flanges 72, 74 each extends radially outward from the runner 70. The aft attachment flange 74 is spaced apart axially from the forward attachment flange 72 to define an inverted π shape of the seal segment 26.

The forward attachment flange 72 and the aft attachment flange 74 are each formed to include one or more air passages 73, 75 (e.g., 73a, 73b, 75a, 75b, etc.). Each air passage 73, 75 has an inlet 77, 79 (e.g., 77a, 77b, 79a, 79b, etc.) that opens radially inward into a radially outward facing surface 72R, 74R of the forward attachment flange 72 and the aft attachment flange 74. Each air passage 73, 75 also has an outlet 81, 83 (e.g., 81a, 81b, 83a, 83b, etc.). The outlets 81 of the air passages 73 of the forward attachment flange 72 open axially aft into an axially-forward surface 72AF, axially forward into an axially-aft surface 72AA, circumferentially into a first circumferential surface 72C1, or circumferentially into a second circumferential surface 72C2 of the forward attachment flange 72. The outlets 83 of the air passages 75 of the aft attachment flange 74 open into an axially-forward surface 74AF, an axially-aft surface 74AA, a first circumferential surface 74C1, or a second circumferential surface 74C2 of the aft attachment flange 74. In the illustrative embodiment, the air passages 73, 75 are machined into the forward attachment flange 72 and/or the aft attachment flange 74, created during a forming and/or casting process of the forward attachment flange 72 and/or the aft attachment flange 74, and/or any other method used in the art.

The one or more air passages 73, 75 of the forward attachment flange 72 and the aft attachment flange 74 provide a path for air to flow through each air passage to regulate a temperature of the forward attachment flange 72 and the aft attachment flange 74. Typically, the forward and aft attachment flanges 72, 74 act as heat sinks carrying high temperatures from the gas path 17 to the first and second split-pin arrangements 30, 32. This challenges the life of pins 42, 44, 46, 48 of the first and second split-pin arrangements 30, 32. The one or more air passages 73, 75 reduce the amount of heat directed to the first and second split-pin arrangements 30, 32 and allow for a drop in pressure to drive the flow of the air.

Turning again to the gas turbine engine 10, the illustrative aerospace gas turbine engine 10 includes the fan 12, the compressor 14, the combustor 16, and the turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 2:
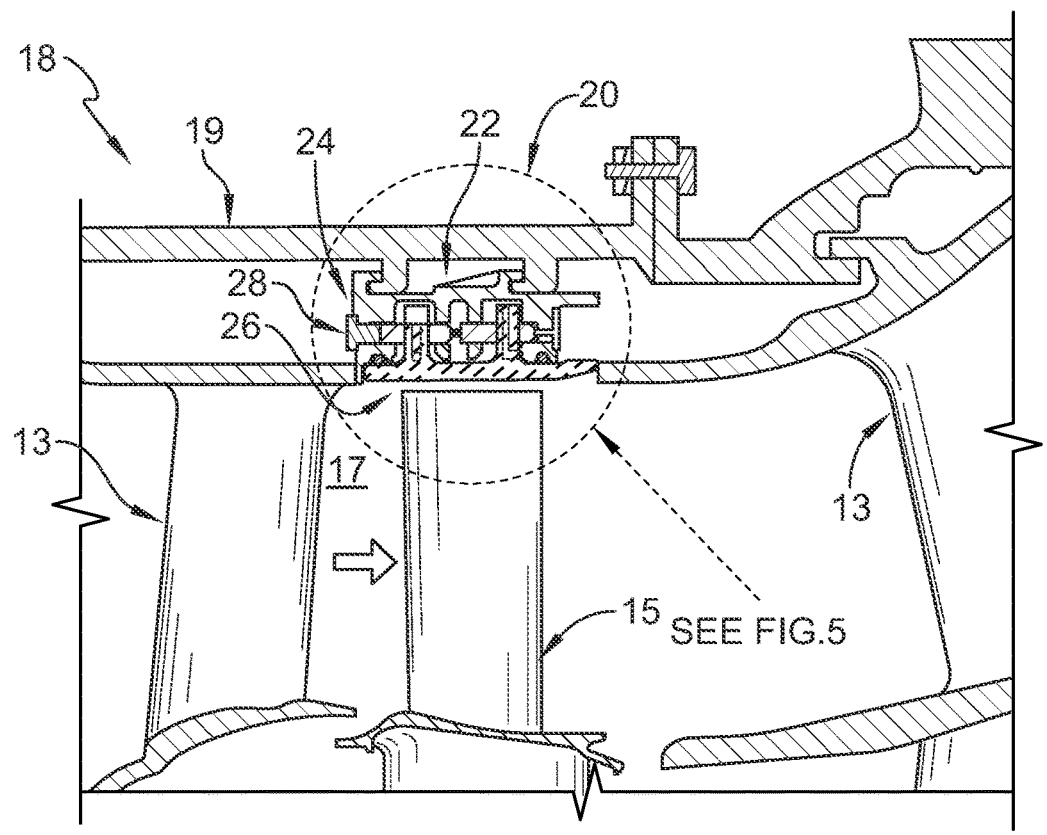
FIG. 2 is a section view of a portion of the gas turbine engine of FIG. 1 showing the turbine further includes a turbine shroud assembly positioned radially outward from blades of one of the rotating wheel assemblies, the turbine shroud assembly including a carrier, a seal segment, and a mount pin assembly having a pin that extends axially into the carrier and the seal segment.

The turbine 18 includes at least one turbine wheel assembly 13 and a turbine shroud assembly 20 positioned to surround the turbine wheel assembly 13 as shown in FIGS. 1 and 2. The turbine shroud assembly 20 is coupled to a case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assemblies 13 along the gas path 17. The blades 15 are in turn pushed by the combustion products to cause the turbine wheel assembly 13 to rotate; thereby, driving the rotating components of the compressor 14 and/or the fan 12.

The turbine shroud assembly 20 extends around the turbine wheel assembly 13 to block combustion products from passing over the blades 15 without pushing the blades 15 to rotate as suggested in FIG. 2. In the illustrative embodiment, the turbine shroud assembly 20 is made up of a number of shroud segments 22, one of which is shown in FIGS. 3-6, that extend only partway around the central axis 11 and cooperate to surround the turbine wheel assembly 13. The shroud segments 22 are sealed against one another, such as by strip seal members, to provide a continuous turbine shroud assembly 20.

In other embodiments, the turbine shroud assembly 20 is annular and non-segmented to extend fully around the central axis 11 and surround the turbine wheel assembly 13. In yet other embodiments, certain components of the turbine shroud assembly 20 are segmented while other components are annular and non-segmented.

Each shroud segment 22 includes the carrier 24, the seal segment 26, and the mount pin assembly 28 as shown in FIGS. 2-7. In the illustrative embodiment, the seal segment 26 comprises ceramic matrix composite materials, while the carrier 24 comprises metallic materials. In other embodiments, the carrier 24, the seal segment 26, and the mount pin assembly 28 may each comprise any suitable materials including ceramics, ceramic matrix composites, metals, alloys, super alloys, etc.

The carrier 24 included in each shroud segment 22 is coupled to the case 19 of the engine 10 as shown in FIG. 2. In the illustrative embodiment, the carrier 24 is segmented, while in other embodiments, the carrier 24 may be a full hoop and extend about the axis 11.

Figure 3:
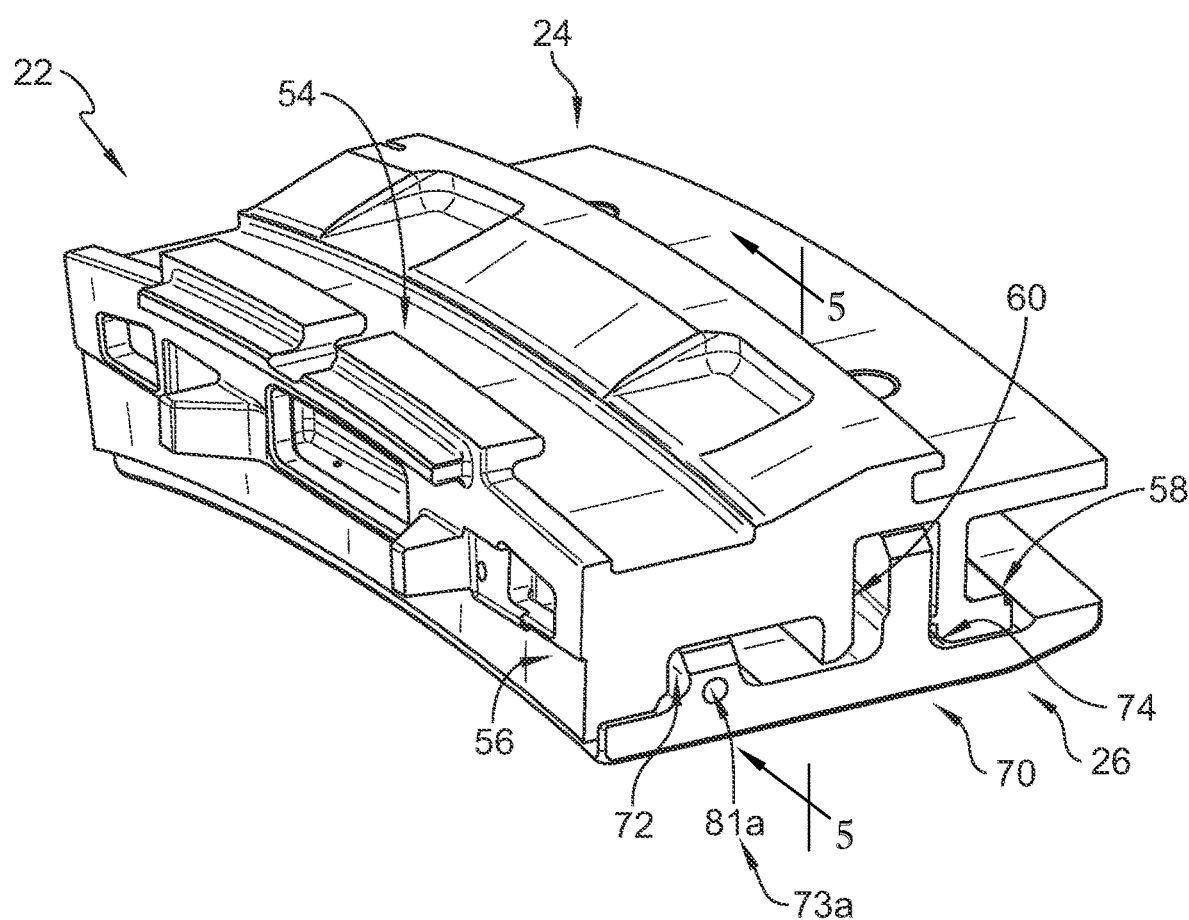
FIG. 3 is a perspective view of the turbine shroud assembly of FIG. 2 showing the carrier is segmented and extends only partway about an axis of the gas turbine engine and the seal segment is formed to include internal air passages.
Figure 4:
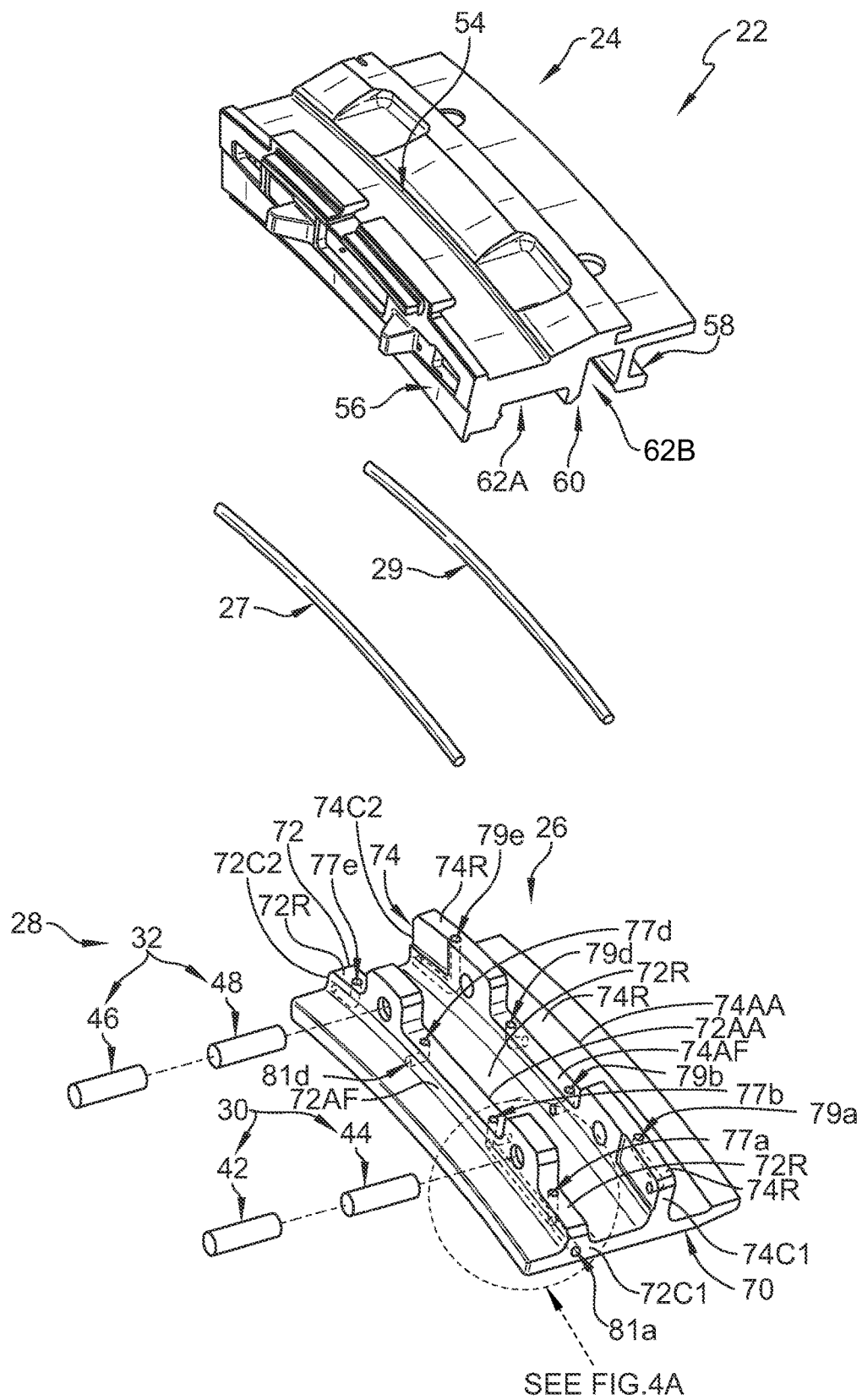
FIG. 4 is an exploded view of the turbine shroud assembly of FIG. 3 showing, from top to bottom, the carrier, the seal segment including a forward attachment flange and an aft attachment flange each having one or more air passages formed therein, and the mount pin assembly.
Figure 4A:
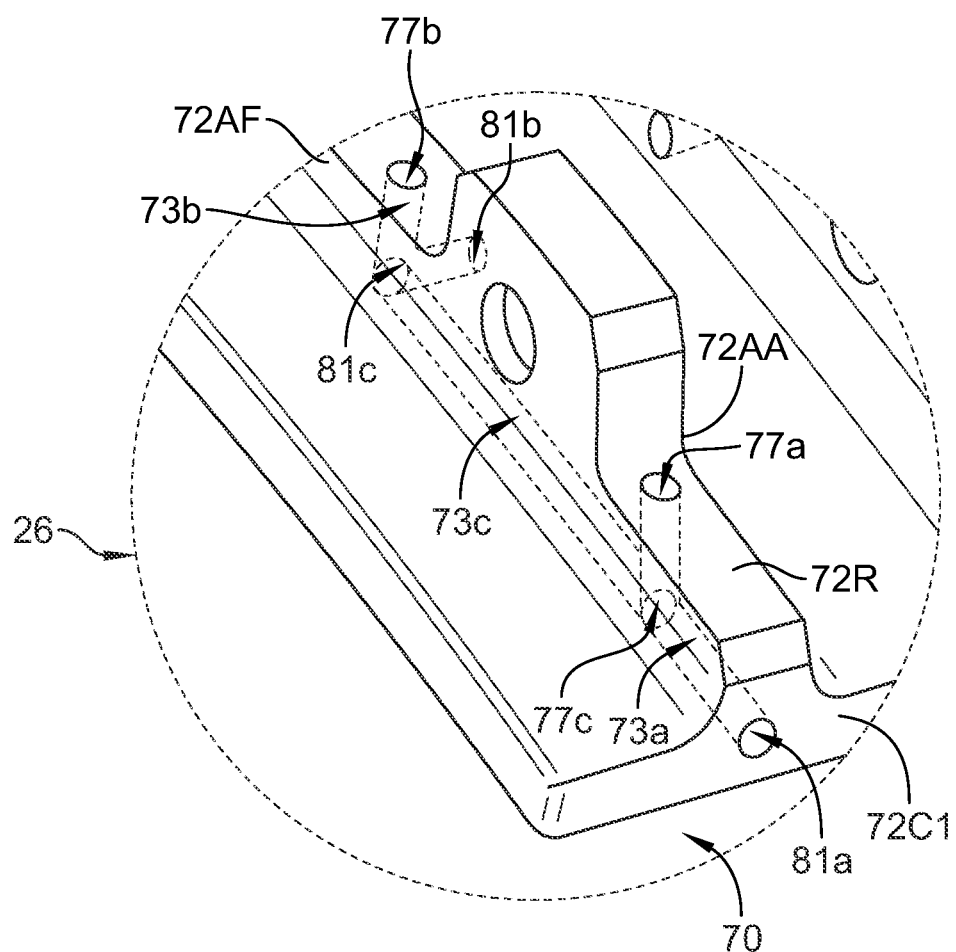
FIG. 4A is a detail view of the turbine shroud assembly of FIG. 4 showing a first air passage and a second air passage formed in the forward attachment flange.

Each carrier 24 illustratively includes an outer wall 54, a forward support wall 56, an aft support wall 58, and an intermediate support wall 60 as shown in FIGS. 3 and 4. The outer wall 54 extends circumferentially at least partway about the axis 11. The forward, aft, and central support walls 56, 58, 60 each extends radially inward from the outer wall 54. The aft support wall 58 is spaced axially from the forward support wall 56. The central support wall 60 is located axially between the forward support wall 56 and the aft support wall 58 to form cavities 62A, 62B.

Figure 5:
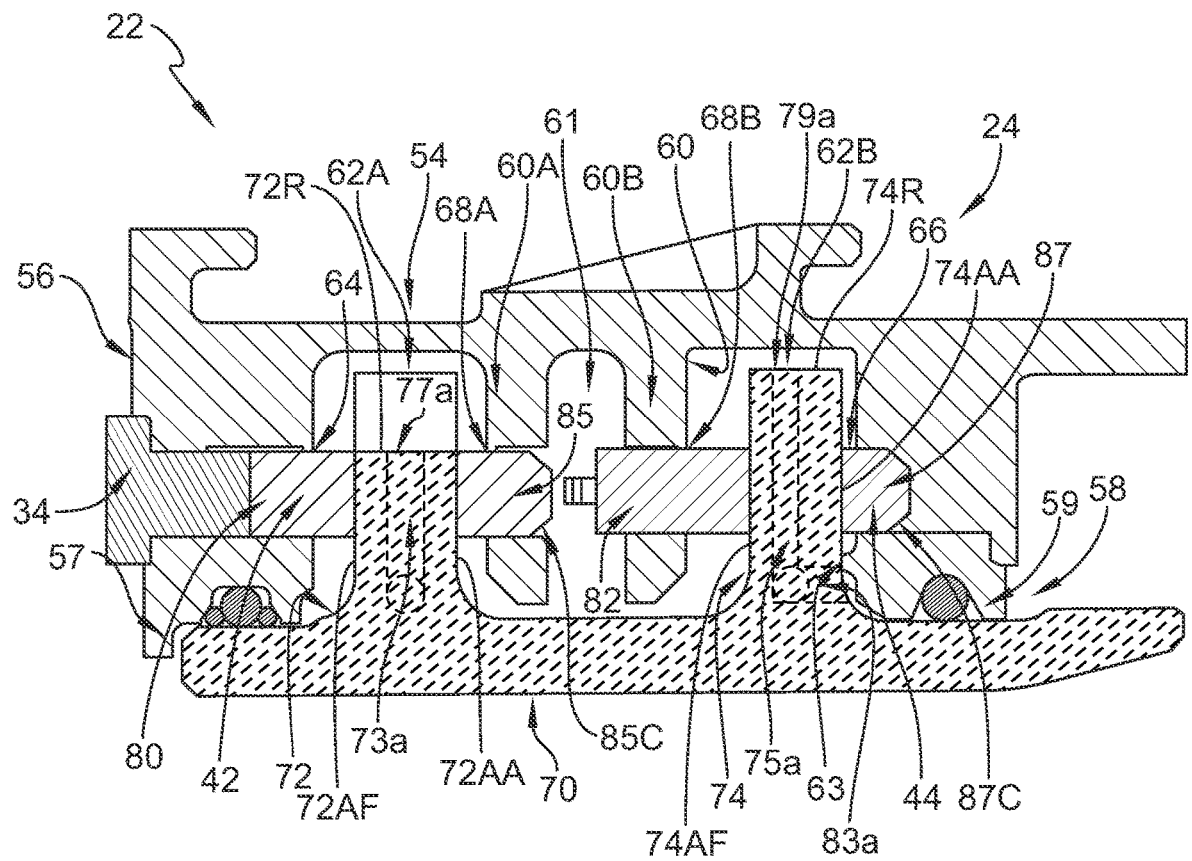
FIG. 5 is a detail cross-sectional view of the turbine shroud assembly of FIG. 2 showing the first air passage formed in the forward attachment flange, a first air passage formed in the aft attachment flange, and the mount pin assembly including a forward pin and an aft pin.

As shown in FIG. 5, the forward support wall 56 includes a forward flange 57 that extends radially inward from the outer wall 54. The aft support wall 58 includes an aft flange 59 and a chordal seal 63 that extends axially away from the aft flange 59. The chordal seal 63 may, in addition to extending axially away from the aft flange 59, also extend circumferentially along the circumferential extent of the aft flange 59 and/or the aft support wall 58, so as to seal off gases flowing along the gas path 17 radially.

The forward support wall 56 is shaped to include forward axially-extending holes 64 as shown in FIG. 5. The first forward axially-extending hole 64 receives a portion of the forward pin 42. The second forward axially-extending hole (not shown) is spaced apart circumferentially from the first forward axially-extending hole 64 and receives the forward pin 46.

Similarly, the aft support wall 58 is shaped to include aft axially-extending holes 66 as shown in FIG. 5. The first aft axially-extending hole 66 receives the aft pin 44. The second aft axially-extending hole (not shown) is spaced apart circumferentially from the first aft axially-extending hole 66 and receives the aft pin 48.

The intermediate support wall 60 includes a forward intermediate flange 60A and an aft intermediate flange 60B as shown in FIG. 5. The forward and aft intermediate flanges 60A, 60B each extends radially inward from the outer wall 54. The aft intermediate flange 60B is spaced apart axially from the forward intermediate flange 60A to define a gap 61 therebetween.

The forward intermediate flange 60A is shaped to include forward holes 68A and the aft intermediate flange 60B is shaped to include aft holes 68B as shown in FIG. 5. The first forward and aft holes 68A, 68B receive the forward pin 42 and the aft pin 44, respectively. The second forward and aft holes (not shown) are spaced apart circumferentially from the first forward and aft holes 68A, 68B and receive the forward pin 46 and the aft pin 48, respectively. The forward and aft holes 68A, 68B are aligned with the corresponding forward axially-extending holes 64 and aft axially-extending holes 66 to receive the forward and aft pins 42, 44, 46, 48.

In some embodiments, any of the holes 64, 66, 68A, 68B may be oval shaped. In other embodiments, any of the holes 64, 66, 68A, 68B may be racetrack shaped. In the illustrative embodiment, the holes 64, 66, 68A, 68B are circular in shape.

The forward attachment flange 72 is arranged between the forward support wall 56 and the forward intermediate flange 60A of the carrier 24 in the forward cavity 62A. The aft attachment flange 74 is arranged between the aft support wall 58 and the aft intermediate flange 60B of the carrier 24 in the aft cavity 62B.

Figure 6:
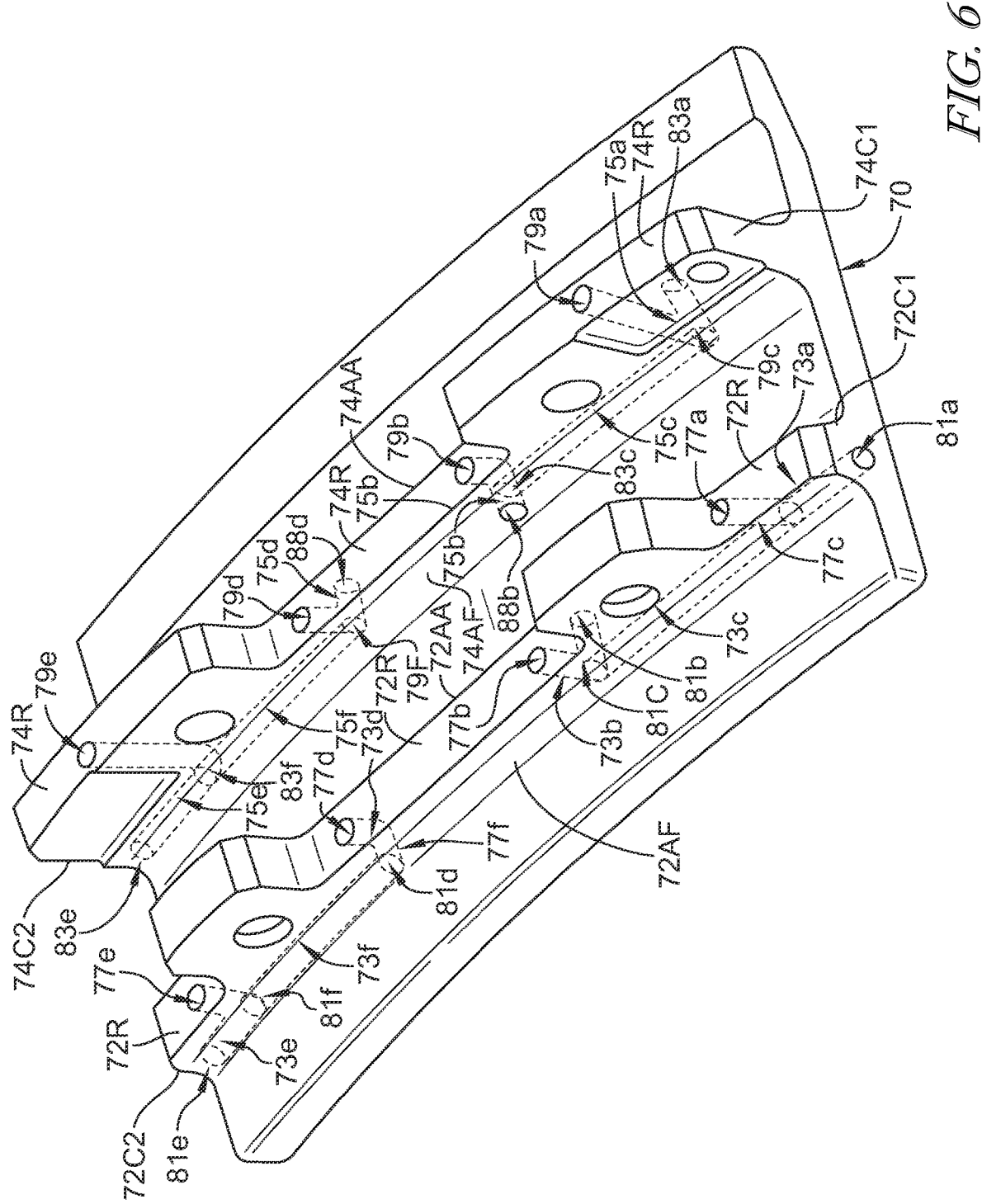
FIG. 6 is a detail perspective view of the seal segment of FIG. 4 showing the one or more air passages formed in the forward and aft attachment flanges each have an inlet and an outlet.

The forward attachment flange 72 is formed to include pin holes 98 which align with holes 64, 66, 68A and 68B and the aft attachment flange 74 is formed to include pin holes 99 which align with holes 64, 66, 68A and 68B as shown in FIGS. 4 and 6. Each pin hole 98, 99 is surrounded by one or more air passages 73, 75 to cool the forward and aft pins 42, 44, 46, 48 when installed in the carrier 24 and seal segment 26.

In the illustrative embodiment shown in FIGS. 4 and 6, the forward attachment flange 72 is formed to include air passages 73a, 73b, 73c, 73d, 73e, and 73f. A first air passage 73a extends between an inlet 77a that opens radially inward into radially outward facing surface 72R and an outlet 81a that opens circumferentially into first circumferential surface 72C1. A second air passage 73b extends between an inlet 77b that opens radially inward into radially outward facing surface 72R and an outlet 81b that opens axially forward into aft axially-facing surface 72AA. The inlet 77a is spaced circumferentially from the inlet 77b so that the first pin hole 98 is arranged circumferentially between inlets 77a and 77b. A third air passage 73c extends between an inlet 77c that opens circumferentially into the first air passage 73a and an outlet 81c that opens circumferentially into the second air passage 73b to fluidly connect with both the first and second air passages 73a, 73b.

Similarly, a fourth air passage 73d extends between an inlet 77d that opens radially inward into radially outward facing surface 72R and an outlet 81d that opens axially aft into forward axially-facing surface 72AF. A fifth air passage 73e extends between an inlet 77e that opens radially inward into radially outward facing surface 72R and an outlet 81e that opens circumferentially into second circumferential surface 72C2. The inlet 77d is spaced circumferentially from inlet 77e so that the second pin hole 98 is arranged circumferentially between inlets 77d and 77e. A sixth air passage 73f extends between an inlet 77f that opens circumferentially into the fourth air passage 73d and an outlet 81f that opens circumferentially into the second air passage 73e to fluidly connect both the fourth and fifth air passages 73d, 73e.

In the illustrative embodiment shown in FIGS. 4 and 6, the aft attachment flange 74 is formed to include air passages 75a, 75b, 75c, 75d, 75e, and 75f. A first air passage 75a extends between an inlet 79a that opens radially inward into radially outward facing surface 74R and an outlet 83a that opens axially forward into aft axially-facing surface 74AA. A second air passage 75b extends between an inlet 79b that opens radially inward into radially outward facing surface 74R and an outlet 83b that opens axially aft into forward axially-facing surface 74AF. The inlet 79a is spaced circumferentially from the inlet 79b so that the first pin hole 99 is arranged circumferentially between inlets 79a and 79b. A third air passage 75c extends between an inlet 79c that opens circumferentially into the first air passage 75a and an outlet 83c that opens circumferentially into the second air passage 75b to fluidly connect with both the first and second air passages 75a, 75b.

Similarly, a fourth air passage 75d extends between an inlet 79d that opens radially inward into radially outward facing surface 74R and an outlet 83d that opens axially forward into aft axially-facing surface 74AA. A fifth air passage 75e extends between an inlet 79e that opens radially inward into radially outward facing surface 72R and an outlet 83e that opens circumferentially into second circumferential surface 74C2. The inlet 79d is spaced circumferentially from inlet 79e so that the second pin hole 99 is arranged circumferentially between inlets 79d and 79e. A sixth air passage 75f extends between an inlet 79f that opens circumferentially into the fourth air passage 79d and an outlet 83f that opens circumferentially into the second air passage 75e to fluidly connect both the fourth and fifth air passages 75d, 75e.

In some embodiments, any of the passages 73a-f, 75a-f may extend between inlets 77a-f, 79a-f and outlets 81a-f, 83a-f formed in any surface 72R, 72AF, 72AA, 72C1, 72C2, 74R, 74AF, 74AA, 74C1, 74C2 of the forward and aft attachment flanges 72, 74. Likewise, all, some, or none of the passages 73a-f, 75a-f may be fluidly connected. In some embodiments, the forward and aft attachment flanges 72, 74 may have more or less than six passages, respectively.

Each of the first split-pin arrangement 30 and the second split-pin arrangement 32 is made up of a forward pin 42, 46 and an aft pin 44, 48 as shown in FIGS. 4-6. The forward and aft pins 42, 44, 46, 48 each extend axially through the seal segment 26 into the carrier 24. The aft pin 44, 48 is circumferentially aligned with and aft of the forward pin 42, 46.

In the illustrative embodiment, the forward pin 42, 46 is in direct confronting relation with the aft pin 44, 48, while remaining separate from the aft pin 44, 48. By installing two pins 42, 44, 46, 48 instead of one single axial pin, the pins 42, 44, 46, 48 allow for independent loading during use in the gas turbine engine 10. The independent loading of the pins 42, 44, 46, 48 accommodates manufacturing tolerances and increases the number of loading points for the seal segment 26. The increased number of loading points decreases localized stresses in the assembly 22.

Additionally, the split-pin fasteners 30, 32 allow each pin 42, 44, 46, 48 to find their own center. In this way, leakage between seals 27, 29 on the forward and aft sides of the seal segment 26 normally caused by misalignment of the holes in the carrier 24 and the seal segment 26 is reduced.

In the illustrative embodiment, the mount pin assembly 28 further includes retainer plugs 34 as shown in FIG. 5. The retainer plugs 34 are configured to block removal of the corresponding split-pin arrangement 30, 32. The retainer plugs 34 extend into the carrier 24 and engage the forward pin 42, 46 to block removal of the split-pin arrangement 30, 32.

The forward pin 42, 46 extends axially through the forward attachment flange 72 of the seal segment 26 into the forward support wall 56 and the forward intermediate flange 60A of the carrier 24. One end 80 of the forward pin 42, 46 extends into the axially-extending blind support hole 64 of the forward support wall 56 while the other end 81 of the forward pin 42, 46 extends into the forward hole 68A of the forward intermediate flange 60A.

The aft pin 44, 48 extends axially through the aft attachment flange 74 of the seal segment 26 into the aft support wall 58 and the aft intermediate flange 60B of the carrier 24. One end 82 of the aft pin 44, 48 extends into the aft hole 68B of the aft intermediate flange 60B, while the other end 83 of the aft pin 44, 48 extends in the axially-extending installation aperture 66 of the aft support wall 58.

The second end 81 of the forward pin 42, 46 is in direct confronting relation with the first end 82 of the aft pin 44, 48, while remaining separate from the aft pin 44, 48 so as to allow for independent loading during use in the gas turbine engine. In the illustrative embodiment, the second end 81 of the forward pin 42, 46 and the first end 82 of the aft pin 44, 48 meet in the gap 61 between the forward and aft intermediate flanges 60A, 60B.

In the illustrative embodiment, the surface that forms the second end 81 of the forward pin 42, 46 may be adhered to the first end 82 of the aft pin 44, 48 for installation purposes. The second end 81 of the forward pin 42, 46 may be adhered to the first end 82 of the aft pin 44, 48 with a glue. During use of the gas turbine engine 10, the glue may burn away, allowing the pins 42, 44, 46, 48 to act independently.

In the illustrative embodiment, the second ends 85, 87 of the pins 42, 44, 46, 48 have a chamfer 85C, 87C as shown in FIG. 5. The chamfer 85C, 87C may help during installation. In other embodiments, the ends 80, 81, 82, 83 may be flat with no chamfer. In some embodiments, the first ends 80, 82 of the pins 42, 44, 46, 48 may have a chamfer in addition to or alternative to the chamfer 85C, 87C.

In the illustrative embodiment, each of the retainer plugs 34 extends into the forward axially-extending installation holes 64 in the forward support wall 56. The first retainer plug 34 extends into the first forward axially-extending hole 64 to block removal of the first split-pin arrangement 30 through the first forward axially-extending hole 64. The second retainer plug (not shown) extends into the second forward axially-extending hole (not shown) to block removal of the second split-pin arrangement 32 through the forward second axially-extending hole (not shown).

In the illustrative embodiments, the split-pin arrangements 30, 32 are installed through the forward support wall 56 of the carrier 24. In other embodiments, the split-pin arrangements 30, 32 may be installed through the aft support wall 58.

Figure 7:
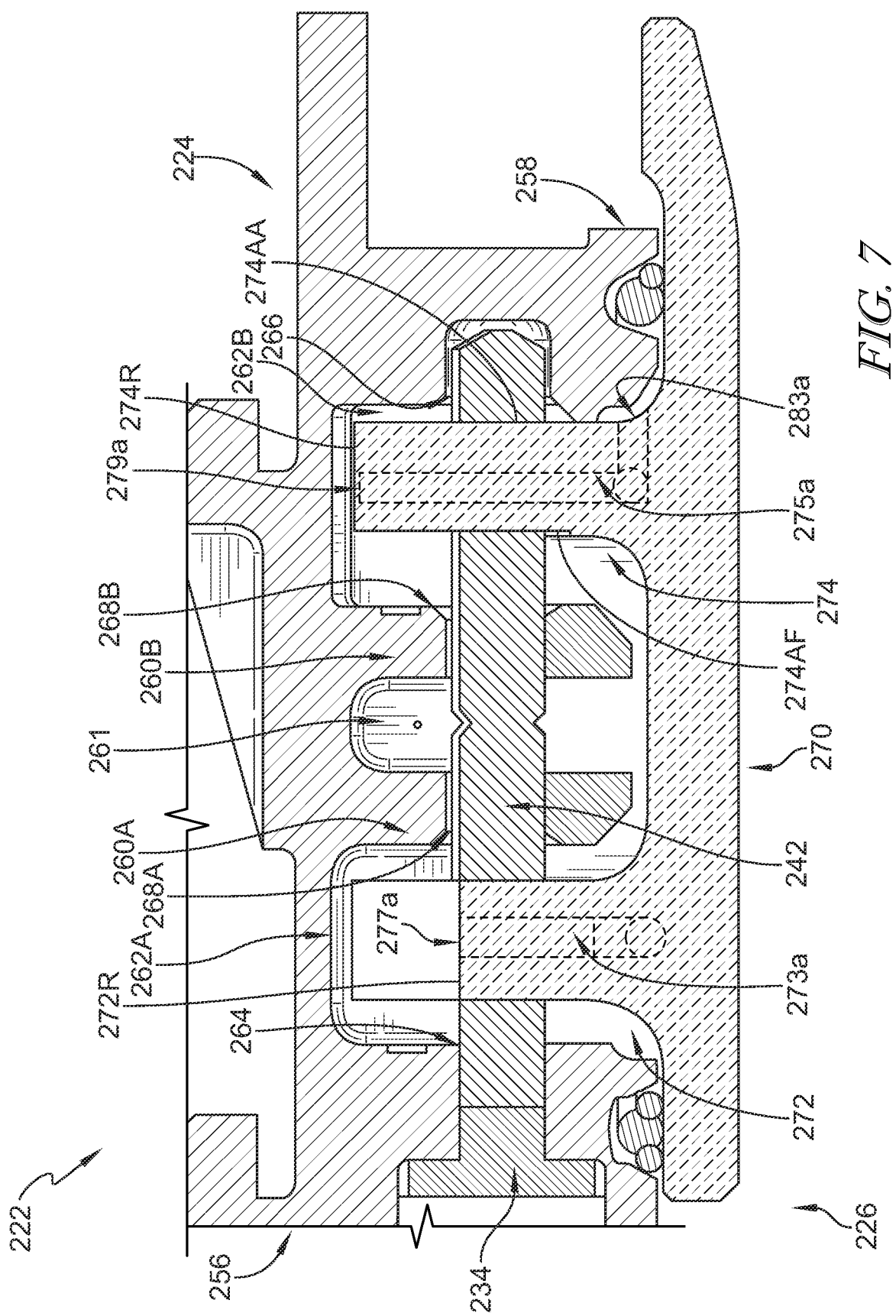
FIG. 7 is a detail cross-sectional view of another turbine shroud assembly like the turbine shroud assembly in FIGS. 1-5 showing that the mount pin assembly includes a single pin extending through the forward attachment flange and the aft attachment flange.

Another embodiment of a turbine shroud segment 222 in accordance with the present disclosure is shown in FIG. 7. The turbine shroud segment 222 is substantially similar to the turbine shroud segment 22 shown in FIGS. 1-6 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 222.

The turbine shroud segment 222 includes a carrier 224, a seal segment 226, and a mount pin assembly 228 configured to couple the seal segment 226 to the carrier 224.

The carrier 224 illustratively includes at least a forward support wall 256, an aft support wall 258, and an intermediate support wall 260. The central support wall 260 is located axially between the forward support wall 256 and the aft support wall 258 to form cavities 262A, 262B. The intermediate support wall 260 includes a forward intermediate flange 260A and an aft intermediate flange 260B as shown in FIG. 7. The aft intermediate flange 260B is spaced apart axially from the forward intermediate flange 260A to define a gap 261 therebetween.

The seal segment 226 is shaped to include a runner 270, a forward attachment flange 272, and an aft attachment flange 274 as shown in FIG. 7.

In the illustrative embodiment shown in FIG. 7, the forward attachment flange 272 is formed to include at least one air passage 273a. The at least one air passage 273a extends between an inlet 277a that opens radially inward into a radially outward facing surface 272R of the forward attachment flange 272 and an outlet (not shown) that opens circumferentially into a first circumferential surface (not shown Similarly, the aft attachment flange 274 is formed to include at least one air passage 275a. The at least one air passage 275a extends between an inlet 279a that opens radially inward into a radially outward facing surface 274R and an outlet 283a that opens axially forward into an aft axially-facing surface 274AA.

In some embodiments, the forward attachment flange 272 and the aft attachment flange 274 may be informed to include more than one air passage 273a, 275a. In some embodiments, any inlet 277a, 279a and/or outlet 283a may be positioned on any surface of the forward attachment flange 272 and the aft attachment flange 274. For example, the outlet 283a may open axially aft into a forward axially-facing surface 274AF. Likewise, all, some, or none of the passages 273a, 275a may be fluidly connected.

In the illustrative embodiment, the mount pin assembly 228 includes at least a first pin arrangement 230 formed as a single pin 242 that is inserted through its respective forward axially-extending hole 264, pin hole 298, forward hole 268A, aft hole 268B, pin hole 299, and aft axially-extending hole 266. Accordingly, air passages 273*a-f*, 275*a-f* are configured to lower the temperature of the single pin 242, 244.

The mount pin assembly 228 further includes at least one retainer plug 234 as shown in FIG. 7. Each retainer plug 234 is configured to block removal of the single pin 242. The retainer plugs 234 extend into the carrier 224 and engage the single pin 242 to block removal of the single pin 242.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use with a gas turbine engine, the shroud assembly comprising a carrier comprising metallic materials and shaped to include an outer wall that extends circumferentially at least partway about an axis, a forward support wall that extends radially inward from the outer wall, an aft support wall spaced axially from the forward support wall that extends radially inward from the outer wall, and an intermediate support wall located axially between the forward support wall and the aft support wall that extends radially inward from the outer wall, a seal segment comprising ceramic matrix composite materials, the seal segment shaped to include a runner that extends circumferentially partway around the axis to define a gas path boundary of the shroud assembly, a forward attachment flange that extends radially outward from the runner arranged between the forward support wall and the intermediate support wall of the carrier, and an aft attachment flange that extends radially outward from the runner arranged between the aft support wall and the intermediate support wall of the carrier, and a mount pin assembly including a pin that extends axially into the forward support wall, the forward attachment flange, the intermediate support wall, the aft attachment flange, and the aft support wall of the carrier, wherein at least one of the forward attachment flange and the aft attachment flange is formed to include a first air passage that has an inlet that opens radially inward into a radially outward facing surface of the at least one of the forward attachment flange and the aft attachment flange and an outlet that opens into one of an axially facing and circumferentially facing surface of the at least one of the forward attachment flange and the aft attachment flange so that air passes through the first air passage to regulate a temperature of the at least one of the forward attachment flange and the aft attachment flange.

2. The turbine shroud assembly of claim 1, wherein the at least one of the forward attachment flange and the aft attachment flange is the forward attachment flange and the outlet opens into the axially facing surface of the forward attachment flange.

3. The turbine shroud assembly of claim 2, wherein the forward support wall includes a forward flange that extends radially inward from the outer wall and the outlet is located at least partially radially inward of the forward flange.

4. The turbine shroud assembly of claim 2, wherein the forward attachment flange is formed to include a second air passage that extends radially through a radially outward facing surface of the forward attachment flange and opens out of a circumferentially facing surface of the forward attachment flange.

5. The turbine shroud assembly of claim 4, further comprising a third air passage formed in the forward attachment flange that extends forward attachment flange circumferentially and fluidly connects with the first air passage and the second air passage.

6. The turbine shroud assembly of claim 1, wherein the at least one of the forward attachment flange and the aft attachment flange is the aft attachment flange and the outlet opens into the circumferentially facing surface of the aft attachment flange.

7. The turbine shroud assembly of claim 6, wherein the aft support wall includes an aft flange that extends radially inward from the outer wall and a chordal seal that extends axially aft from the aft flange into contact with the aft attachment flange and the outlet is located at least partially radially inward of the chordal seal.

8. The turbine shroud assembly of claim 6, wherein the aft attachment flange is formed to include a second air passage that extends radially through a radially outward facing surface of the of the aft attachment flange and opens out of a circumferentially facing surface of the aft attachment flange.

9. The turbine shroud assembly of claim 8, further comprising a third air passage formed in the aft attachment flange that extends aft attachment flange circumferentially and fluidly connects with the first air passage and the second air passage.

10. The turbine shroud assembly of claim 1, wherein the pin includes a forward pin and an aft pin circumferentially and radially aligned with the forward pin, the forward pin extends into the forward attachment flange of the seal segment and the aft pin extends into the aft attachment flange of the seal segment.

11. The turbine shroud assembly of claim 10, wherein the intermediate wall includes a forward intermediate flange and an aft intermediate flange, the forward pin extends into the forward intermediate flange, and the aft pin extends into the aft intermediate flange.

12. The turbine shroud assembly of claim 1, further comprising a second air passage wherein the at least one of the forward attachment flange and the aft attachment flange is both the forward attachment flange and aft attachment flange, wherein the outlet of the first air passage opens into the axially facing surface of the forward attachment flange, and further comprising a second air passage having an inlet that opens radially inward into a radially outward facing surface of the aft attachment flange and an outlet that opens into the axially facing surface of the aft attachment flange.

13. A turbine shroud assembly adapted for use with a gas turbine engine, the shroud assembly comprising a carrier that includes an outer wall that extends circumferentially at least partway about an axis, a first support wall that extends radially inward from the outer wall, a second support wall spaced axially from the first support wall that extends radially inward from the outer wall, and a third support wall located axially between the first support wall and the second support wall that extends radially inward from the outer wall, a seal segment shaped to include a runner that extends circumferentially partway around the axis, a first attachment flange that extends radially outward from the runner and is arranged between the first support wall and the third support wall of the carrier, and a second attachment flange that extends radially outward from the runner and is arranged between the second support wall and the third support wall of the carrier, and a mount pin assembly including a pin that extends axially into the first support wall, the first attachment flange, the third support wall, the second attachment flange, and the second support wall of the carrier, wherein the first attachment flange is formed to include a first air passage that has an inlet that opens radially inward into a radially outward facing surface of the first attachment flange and an outlet that opens out of one of an axially facing and circumferentially facing surface of the first attachment flange.

14. The turbine shroud assembly of claim 13, wherein the outlet opens into the axially facing surface of the first attachment flange.

15. The turbine shroud assembly of claim 14, wherein the first support wall includes a first flange that extends radially inward from the outer wall and the outlet is located at least partially radially inward of the first flange.

16. The turbine shroud assembly of claim 14, wherein the first attachment flange is formed to include a second air passage that extends radially through a radially outward facing surface of the first attachment flange and opens out of a circumferentially facing surface of the first attachment flange.

17. The turbine shroud assembly of claim 16, further comprising a third air passage formed in the first attachment flange that extends circumferentially and fluidly connects with the first air passage and the second air passage.

18. The turbine shroud assembly of claim 13, wherein the outlet opens into the circumferentially facing surface of the first attachment flange.

19. The turbine shroud assembly of claim 13, wherein the pin includes a first pin and a second pin circumferentially and radially aligned with the first pin, the first pin extends into the first attachment flange of the seal segment and the second pin extends into the second attachment flange of the seal segment.

20. The turbine shroud assembly of claim 19, wherein the third wall includes a first intermediate flange and a second intermediate flange, the first pin extends into the first intermediate flange, and the second pin extends into the second intermediate flange.

* * * * *